(12) United States Patent
Smith

(10) Patent No.: US 9,948,137 B2
(45) Date of Patent: Apr. 17, 2018

(54) GRID TIE CHARGE CONTROLLER

(71) Applicant: Rick Smith, Bakersfield, CA (US)

(72) Inventor: Rick Smith, Bakersfield, CA (US)

( * ) Notice: Subject to any disclaimer, the term of this patent is extended or adjusted under 35 U.S.C. 154(b) by 301 days.

(21) Appl. No.: 14/798,092

(22) Filed: Jul. 13, 2015

(65) Prior Publication Data
US 2016/0028271 A1    Jan. 28, 2016

Related U.S. Application Data

(60) Provisional application No. 62/027,555, filed on Jul. 22, 2014.

(51) Int. Cl.
| | |
|---|---|
| H02J 7/00 | (2006.01) |
| H02J 7/14 | (2006.01) |
| H02J 7/35 | (2006.01) |
| H02J 3/38 | (2006.01) |
| H02J 50/40 | (2016.01) |

(52) U.S. Cl.
CPC ............... *H02J 7/35* (2013.01); *H02J 3/383* (2013.01); *H02J 50/40* (2016.02); *H02J 3/385* (2013.01); *Y02B 10/14* (2013.01); *Y02E 10/563* (2013.01); *Y02E 10/566* (2013.01); *Y02E 10/58* (2013.01)

(58) Field of Classification Search
USPC ..... 320/101, 104, 127, 128; 307/82, 80, 125
See application file for complete search history.

(56) References Cited

U.S. PATENT DOCUMENTS

| | | | | |
|---|---|---|---|---|
| 8,269,374 | B2* | 9/2012 | De Caires | H02J 7/35 307/66 |
| 8,779,627 | B2* | 7/2014 | Gerhardinger | G05F 1/67 136/244 |
| 2008/0097655 | A1* | 4/2008 | Hadar | H02J 13/002 700/286 |
| 2010/0327766 | A1* | 12/2010 | Recker | H02J 9/02 315/291 |
| 2011/0125338 | A1* | 5/2011 | Perot | H02J 3/383 700/292 |
| 2012/0051095 | A1* | 3/2012 | Steigerwald | H02M 3/158 363/21.01 |
| 2012/0161527 | A1* | 6/2012 | Casey | H01L 31/02021 307/80 |
| 2012/0181973 | A1* | 7/2012 | Lyden | B60L 11/182 320/101 |
| 2012/0191263 | A1* | 7/2012 | Kuniyosi | H02J 3/383 700/286 |

(Continued)

*Primary Examiner* — Alexis Pacheco
(74) *Attorney, Agent, or Firm* — Clement Cheng

(57) ABSTRACT

A system extracts power from a typical high voltage (200-500 vdc) grid tie solar system and deliver it to a low voltage (12-24 vdc) battery bank. This product parallel connects in between an existing grid tie solar array, and an existing grid tie inverter, transforming the voltage down, and acting as a charge controller, engaging and disengaging as necessary to keep the low voltage battery bank at a high state of charge. This system enables the grid tie PV array to have a second use as the energy source for a low DC voltage off grid system. This system, when combined with standard low DC voltage grid inter-active off grid inverter/charger, and a battery bank, forms a complete off grid system, while allowing the host grid tie system to function normally when the grid is on.

13 Claims, 13 Drawing Sheets

(56) References Cited

U.S. PATENT DOCUMENTS

| | | | |
|---|---|---|---|
| 2012/0310560 A1* | 12/2012 | Ozaki | G01R 22/10 702/62 |
| 2014/0062192 A1* | 3/2014 | Vichnyakov | H02J 3/385 307/26 |
| 2014/0088780 A1* | 3/2014 | Chen | G05F 1/66 700/295 |
| 2014/0091622 A1* | 4/2014 | Lucas | H02J 3/32 307/19 |
| 2014/0121849 A1* | 5/2014 | Ansari | H02J 3/383 700/295 |
| 2014/0333140 A1* | 11/2014 | Baba | H02J 3/12 307/82 |
| 2015/0188401 A1* | 7/2015 | Zheng | H02M 1/00 363/95 |
| 2016/0204480 A1* | 7/2016 | Triebel | H02J 7/34 429/7 |

\* cited by examiner

Grid Tie Charge Controller Application Diagram Figure 1

Grid Tie Charge Controller Alternate Application Diagram Figure 2

Grid Tie Charge Controller Transformer Power Match Ckt, Figure 5

Grid Tie Charge Controller Low IGBT Drive Protection Ckt, Figure 8

Grid Tie Charge Controller Secondary Battery Over Voltage Protection Figure 9

GRID TIE CHARGE CONTROLLER

The present invention is a non-provisional of and claims priority from provisional application 62/027,555 filed Jul. 22, 2014 by same inventor F. H. (Rick) Smith, of Bakersfield, Calif. entitled Grid Tie Charge Controller, the disclosure of which is incorporated herein by reference.

FIELD OF THE INVENTION

The present invention is in the field of grid tied charge controllers, more specifically a method for making a high voltage photovoltaic array work for both on and off grid applications.

DISCUSSION OF RELATED ART

The evolution of on grid and off grid photovoltaic systems has naturally resulted in differing architectures between on grid and off grid systems. Since power grids have historically been very reliable, on grid systems have focused on efficiency, and have therefore been generally designed to operate at high voltages in hopes of minimizing both IR losses, transistor junction losses, and in some cases transformer losses, while not giving consideration to adding energy storage. Off grid systems on the other hand, have been built around commonly available battery technology which stacks together in increments of 2, 6, or 12 volts to make up common system voltages of 12, 24, and 48 vdc. While off grid systems are typically lower power than grid tie systems, they have been successful in growing to higher power levels because of enabling enhancement mode MOSFET technology, and the fact that low DC voltages are largely confined to short connections between the battery and the off grid inverter, again, keeping IR losses at reasonable levels. Product is greatly available in the low voltage off grid arena. The cost of low voltage off grid product is relatively low. This creates a bias in favor of using existing low voltage off grid products. What is needed is away to bridge the gap between the high voltage grid tie world, and the low voltage off grid world.

By contrast to the present invention, there are several strategies in prior art for combining on grid and off grid functionality. U.S. Pat. No. 8,751,053 entitled Method And System To Provide A Distributed Local Energy Production System With High-Voltage DC Bus issued Jun. 10, 2014, the disclosure of which is incorporated herein by reference, uses a proprietary switching strategy in combination with proprietary controllable per photo voltaic panel MPP DC to DC converter to regulate charge to the system battery. Also, United States patent publication US20140062192A1 published Mar. 6, 2014, the disclosure of which is incorporated herein by reference, entitled Grid Interactive Double Conversion Inverter, leverages a series of bi-directional DC to AC converters, and DC to DC converters, pivoting around an internal bus, combined with cascaded control loops to ensure that the protected load and the battery are serviced, while pushing off excess power to the grid.

SUMMARY OF THE INVENTION

The present invention grid tie charge controller is a solar power system battery adapter that is designed to be retrofitted to an existing grid tie as a single package. The physical unit is preferably housed within a small metal electrical cabinet. The purpose of this product is to safely and simply add battery storage to common preexisting home grid-tie solar system as a retrofit, without disturbing the existing wiring and without removing the existing grid tie inverter. Commonly, gird tie systems stop supplying power when the utility power fails. Utility power failure when a user needs and expects the photovoltaic system to maintain the household current. This present invention automatically keeps a large bank of batteries charged so power can be used indefinitely in a power failure.

FIGS. 1, 2 are block diagrams that illustrate how the Grid Tie Charge Controller is installed into a typical system for enabling a standard grid tie solar system to provide back up power in a power failure.

The Grid Tie Charge Controller is simply wired in parallel with the connection between the solar array and the gird-tie solar inverter. As long as the battery bank remains at a high state of charge, the Grid Tie Charge Controller draws less than one watt out of the grid-tie system, allowing the grid-tie system to do what it does best, deliver power to the utility, and generate electricity for the household. In the event of a power failure, the protected loads will begin drawing power out of the batteries. Once the Grid Tie Charge Controller senses that the battery voltage has dropped, it automatically engages and starts transferring power from the solar array to the battery bank. By design, the grid-tie inverter (which is part of the existing photovoltaic system) automatically disengages itself when the utility power fails, allowing all the power to travel through the Grid Tie Charge Controller to the battery bank/battery inverter supplying the protected load. When the battery bank becomes fully charged, the Grid Tie Controller disengages and allows the batteries to drain down to the point where the Grid Tie Controller reengages and begins another charge cycle. This process is completely automatic and continues indefinitely. The battery bank is like a bank account, and one needs to keep track of deposits and withdrawals to prevent an outage. This is most simply done by monitoring the battery band voltage.

The Grid Tie Charge Controller is a unique and safe approach to adding battery back up functionality to a standard high DC voltage solar grid-tie system, allowing no compromises in the go-green high energy efficiency that a high voltage solar grid-tie system delivers. Since the National Electric code discourages battery systems in residential settings from operating at over 48 vdc, present day grid-tie plus solar back up power solutions make use of 48 vdc or less input voltage on grid-tie inverters. Moving, after the fact, to a low voltage grid-tie system to get the solar back up from a high voltage grid-tie system is very expensive. Expensive costs include modifications to the photovoltaic array due to rewiring with larger gauge wire, a new grid-tie inverter needs to be purchased, and a charge controller needs to be purchased, and there still needs to be a system to prioritize between keeping the batteries full and delivering power to the grid. The Grid Tie Charge Controller allows the solar back up functionality to be retrofitted and added to a standard grid-tie system without any changes to the grid-tie system.

The grid tie charge controller includes common safety features. The first, and most obvious, is a fire safety feature of the Grid Tie Charge Controller is that it is housed in a heavy metal enclosure that preferably meets NEMA 12 specifications. There are a number of less obvious, but equally important electrical safety features such as:

The High Voltage switching transistors are rated for 1200V/50 A, much higher voltage and currents than the system operates at.

All high voltage components are optically and galvanically isolated from everything, the low voltage circuits, ground, etc.

If the DC supply voltage drops too low to where the IGBT (Insulated Gate Bi-Polar Transistors may not get solidly turned on, the driver circuit is dis-engaged.

Although it is the responsibility of the automatic charge controller circuit within the Solar System Battery Adaptor to make sure the storage batteries can not be over-charged, the remote possibility of a failure of this circuit is backup by an independent voltage sensing circuit with a "lockout" feature.

Temperature compensation of final charge voltage.

Circuit breaker and fuse protection.

The grid tie charge controller system for an existing high-voltage photovoltaic array has a grid tied charge controller connecting in parallel between the existing high voltage photovoltaic array and an existing high voltage gird tie inverter, wherein the grid tie charge controller is configured to retrofit "tap in" to an existing grid tie photovoltaic system to draw off power to charge storage batteries. A transformer transforms a high voltage of between 200-500 vdc of the photovoltaic array down to a battery bank. The battery bank is a low voltage high current 12/24 v battery bank. An automatic charge control circuit governs the battery bank that engages and disengages as necessary to maintain the battery at a preset charge state. The automatic charge control includes a temperature compensator of a disengagement point. The grid tie charge controller system enables an existing high voltage solar array that is part of an existing grid tie system to support an auxiliary functionality of powering a low voltage off grid system.

The automatic charge control is configured to coordinate in real time with an existing grid tie system such that when the grid is in a failure mode, the grid tie inverter disengages automatically when the grid goes out of specification, isolating the present invention grid tie charge controller while allowing full use of the existing high-voltage photovoltaic array. The automatic charge control coordinates in real time with an existing grid tie system when the grid is normal, in two modes depending upon two conditions, namely: if the off grid load is within a replenishment capability of either a grid interactive inverter, or a charging system that runs on the grid, the automatic charge control stays off because its startup voltage is set to a lower voltage than the storage batteries will dip to when the grid is on and the storage batteries are being constantly; and if the grid load is over-running the replenishment capability of either a grid interactive inverter, or a charging system, or if a separate grid supplied charging system does not exist, the automatic charge control will start up and assist in supporting the off grid load.

The actual split in power from the solar array between the existing grid tie inverter and the grid tie charge controller system is governed by interaction with the grid tie inverter's MPPT (Maximum Power Point Tracking) system, wherein the grid tie charge controller system coordinates with the grid tie inverter MPPT function to either direct the bulk of the array power to this invention, or to the grid tie inverter, wherein a low setting of the lower limit of grid tie MPPT voltage will allow the grid tie inverter to starve this invention, and conversely a high setting of the lower limit on the grid tie MPPT voltage will cause this invention to receive the bulk of the array power.

The automatic charge control is preferably configured to power match between a grid tie system's solar array and a low voltage set of batteries that are part of an off grid system by pre-selecting the right tap on a step down transformer based on the ratio of the voltage of the grid tie solar array to a normal operating voltage of the off grid battery system. Taps are provided to account for either seven, eight, nine, or ten 24 v nominal solar panels being connected in series as part of the solar array that makes up the host grid tie system.

The automatic charge control is preferably configured to use a simple transformer turns ratio to set the power match with the solar array to avoid a potentially unstable interaction that would likely exist if this device and the existing grid tie inverter were both trying to implement closed loop MPPT functions at the same time. The automatic charge control is configured to sample voltage on the high voltage input via an optically isolated circuit to determine whether the solar array is in sunlight or not, wherein if the solar array is not in sunlight, the grid tied charge controller system does not engage.

The automatic charge control is preferably configured with transformer isolation to achieve complete electrical isolation between the high voltage, the low voltage, and the IGBT (Insulated Gate Bi-Polar Transistors) drive circuit sections in order to: not conflict with the unknown internal architecture of the grid tie inverter this invention gets paired with, eliminating possible ground fault tripping, or worse yet, a potential short circuit; insure compatibility with negative or positive ground off grid side equipment; eliminate the possibility that an IGBT drive circuit failure would result in an IGBT being "stuck on".

The automatic charge control is preferably configured with engineering controls to insure that SOA (Safe Area of Operation) is maintained for the IGBT devices including: control of the driver circuit supply voltage to ensure that if there isn't enough voltage to make sure the IGBT's are solidly switched on, the driver circuit is shutdown completely immediately, and is not allowed to re-start until there is enough voltage plus a safety margin; IGBT's are deliberately oversized to 1200V, 50 A, to insure short term voltage of current overloads can be handled; a resistor, capacitor, diode network is provided at the gate circuit of each IGB to deliberately delay start up until the opposing IGBT is turned off; and a fuse at the high voltage DC input just in case a user would accidentally pair this invention with solar array of a higher wattage rating than this invention is rated for.

The automatic charge control preferably further includes a diode at the high voltage DC input to prevent any backflow of power to existing solar array or to the existing grid tie inverter. The automatic charge control further includes a low voltage output that is both diode and circuit breaker protected to both prevent any back flow of energy, and protected against large battery currents flowing in the event of an internal circuit failure. The automatic charge control further includes a secondary voltage sensing relay that unlatches a control relay that has been latched up on its own contacts, permanently dropping the IGBT drive signal until a human can investigate the reason for the "control failure" that allowed the high-high battery voltage condition, wherein the grid tied charge controller system is restarted when a user pushes the start button after the battery voltage is down into an acceptable range. The automatic charge control further includes a separate circuit for sensing battery voltage right at the battery terminals so that decision point voltages are not distorted voltage drop in the main power leads that carry large amounts of current on the low voltage off grid side.

Figure 1:
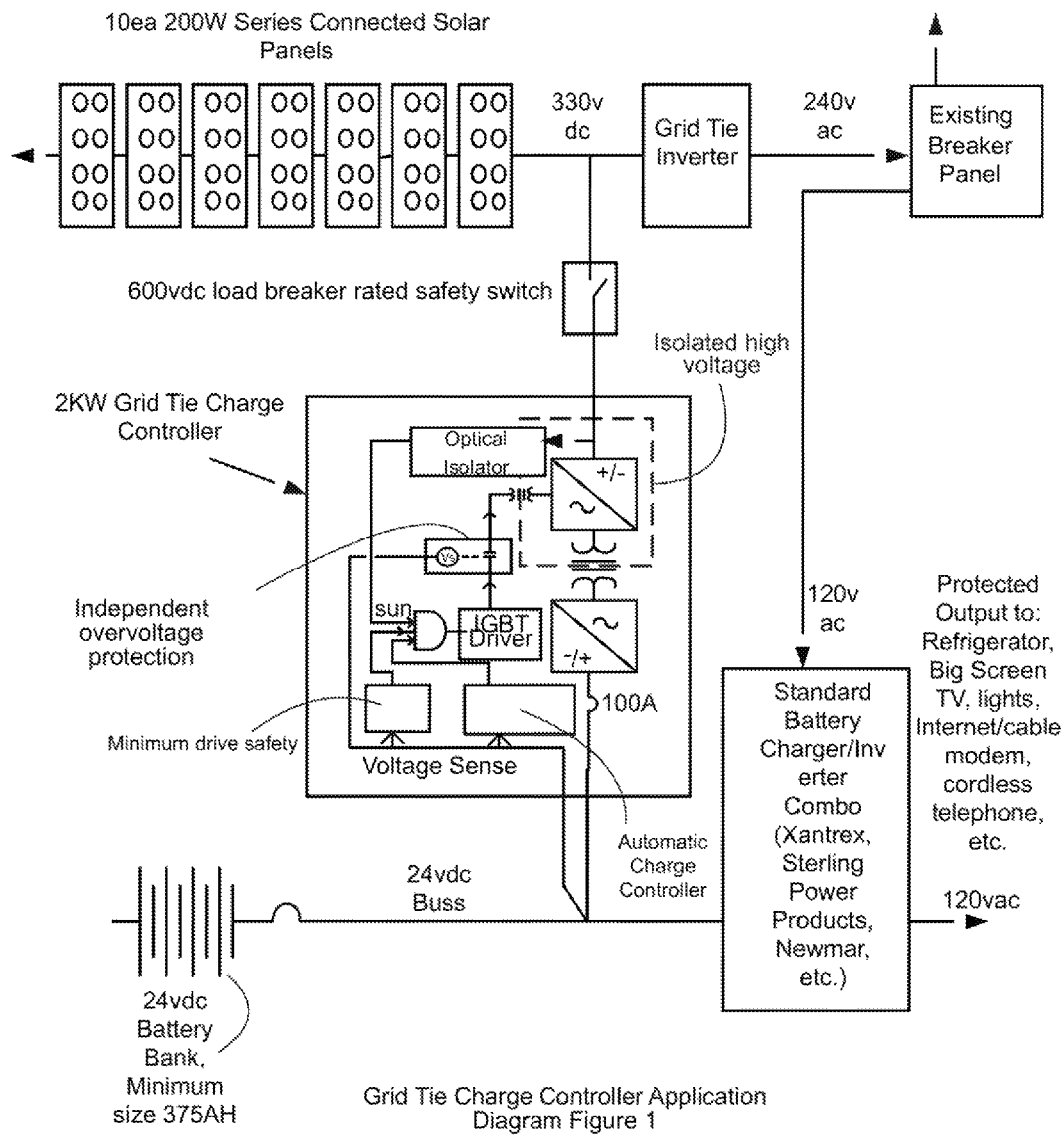
FIG. 1 is a diagram of the grid tie charge controller application.

The following call out list of elements can be a useful guide for referencing the elements of the drawings.

101 existing breaker panel return
102 240 V AC side
103 grid tie inverter
104 120 V AC side
105 330 V DC side
106 isolated hi voltage
108 protected output
109 combination charger inverter
110 600 V DC load breaker rated safety switch
111 solar panel or solar panel array
113 2 kW grid tie charge controller
114 independent over voltage protection
115 Minimum drive safety
116 24 V DC battery bank
117 24 V DC bus
118 automatic charge controller
119 voltage sense
120 optical isolator
121 IGPT driver (Insulated Gate Bipolar Transistor Driver)
122 Standard inverter
123 battery charger
124 sun input
125 inverter
126 rectifier
127 100 amp main output line
129 end of charge junction
130 Temperature Compensation sensor
131 reference voltage
132 battery full output
133 adjustment 8 V DC
134 resistor 15
135 IC input
136 resistor R6
137 ground control circuit
138 switch setting switch open 12V close 24V
139 Half Bridge Rectifier
140 DC out positive
141 DC out negative
142 Transformer secondary reconfigurable/
143 transformer primary
144 high-voltage AC from IGBT H bridge
145 high-voltage DC to the IGBT H bridge
146 DC disconnect
147 low sun output
148 integrated circuit quad operational amplifier
149 First Insulated Gate Bipolar Transistor
150 Second Insulated Gate Bipolar Transistor

DETAILED DESCRIPTION OF THE PREFERRED EMBODIMENT

A grid tie charge controller system for an existing high-voltage photovoltaic array has a grid tied charge controller connecting in parallel between an existing high voltage photovoltaic array and an existing high voltage gird tie inverter. The present invention grid tie charge controller system 113 ties in between the 330 V DC side 105 and the 24 V DC bus 117 so that it completely bypasses the grid tie inverter. It can be used along with a standard charge controller, or without if a standard charge controller is absent. The grid tie charge controller is configured to retrofit "tap in" to an existing grid tie photovoltaic system to draw off power to charge storage batteries; (See FIG. 1 & FIG. 2. Application Diagrams) The grid tie charge controller has a transformer that transforms the relatively high voltage (200-500 vdc) of a typical grid tie solar system down to low voltage, high current, 12/24 v battery bank typically used in an "off grid" type systems; and (See FIG. 3. Block Diagram) The existing system has typical features such as an existing breaker panel return 101, a 240 V AC side 102, a grid tie inverter 103, a 120 V AC side 104, a 330 V DC side 105, a standard battery charger inverter 109 and a protected output 108 typically having 120 V AC. Alternatively, as seen in FIG. 2, a standard inverter 122 or a battery regulated power supply 123 can be a part of the pre-existing system. The grid tie charge controller 113 is connected to the 330 V DC side 105 at a load breaker such as a 600 V DC load breaker rated safety switch 110. The high-voltage input 105 passes power from an inverter 125 to a rectifier 126 which sends to a 100 amp main output line 127

A key safety feature in this present invention is the isolated high-voltage 106 circuit that provides an additional layer of safety. The grid tie charge controller 113 has an automatic charge control 118 over the low voltage battery bank 116, with adjustable points for engaging and disengaging as necessary to maintain the battery at a preset charge state. The grid tied charge controller 113 is connected to the battery bank 116 by a 24 V DC bus 117. The grid tie charge controller 113 also has an optical isolator 120 that provides a sun input 124 to allow photosensor shut off via the IGBT driver 121 when the sun goes down. IGBT stands for insulated gate bipolar transistor driver which is an electrical switch that switches on and off depending upon inputs received such as the sun input 124. Additional inputs to the IGBT driver 121 may come from a minimum drive safety 115 which receives an input from a voltage sense 119, which receives an input from the 24 V DC bus 117. Also, the automatic charge controller 118 can turn off the charging via the IGBT driver 121. The difference between the minimum drive safety and the automatic charge controller is that the minimum drive safety is a set amount that is predetermined, rather than a dynamically changing automatic charge controller.

The automatic charge control 118 includes a temperature compensator sensor 130 of the disengagement point with an end of charge junction having a preset value. See FIG. 3

Figure 4:
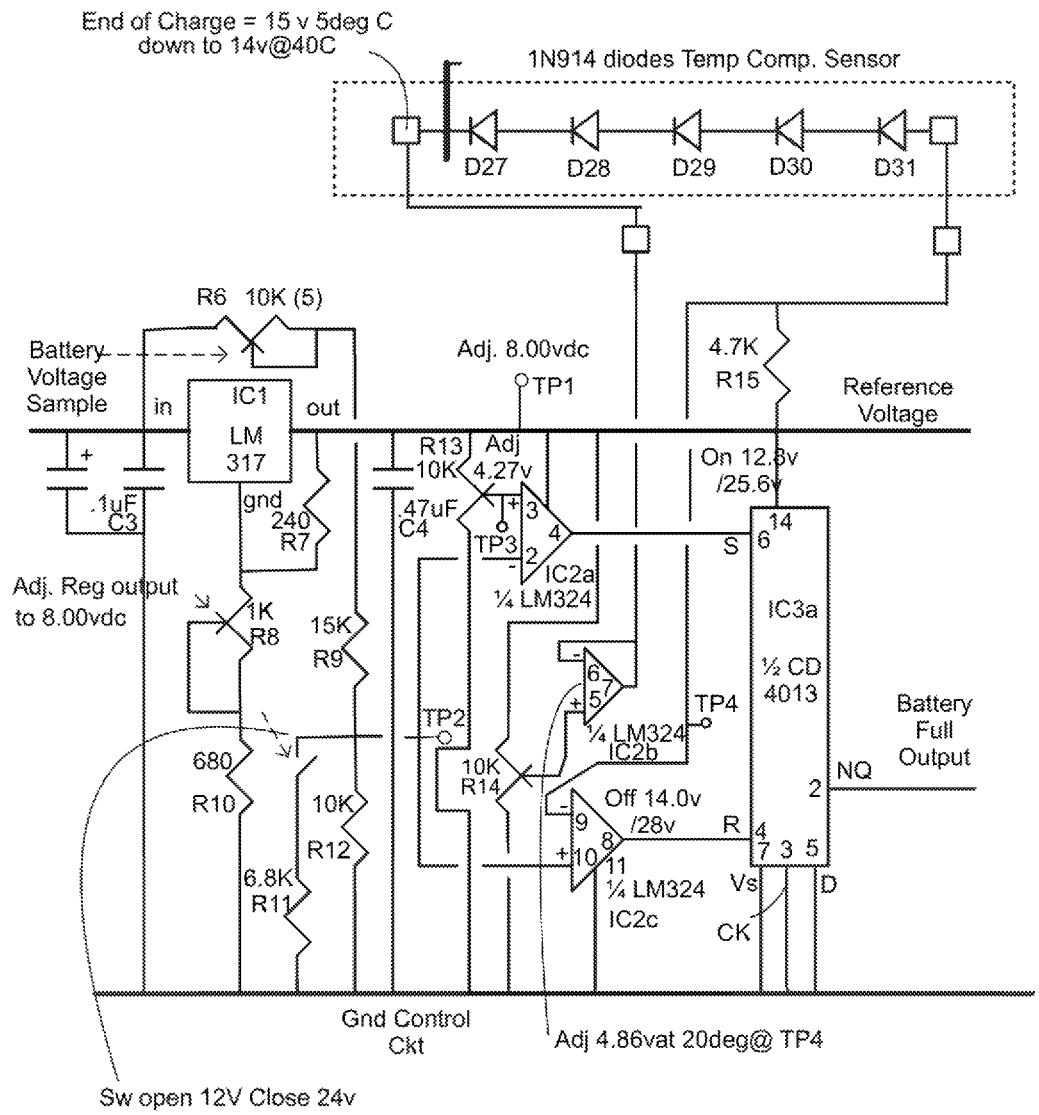
FIG. 4 is a circuit diagram of the retired charge controller battery voltage control circuit.

Block Diagram, and FIG. 4 Battery Voltage Control Section. The grid tie charge controller enables an existing high voltage solar array 111 that is part of an existing grid tie system to support the auxiliary functionality of being the "energy source" for a low voltage off grid system.

The components of the grid tie charge controller such as the battery voltage control circuit can be made of a variety of off-the-shelf components such as a resistor R6 136, and a resistor R 15 134, as seen in FIG. 4. A switch setting 138 can set a switch to an open voltage of 12 V and a closed voltage of 24 V. A ground control circuit 137 can be opposite a reference voltage 131 on the printed circuit board. A battery full output 132 can be provided from the integrated circuit quad operational amplifier. An IC input 135 can have an on voltage of 12.2 V and an off voltage of 25.6 V.

The automatic charge control coordinates in real time with an existing grid tie system such that when the grid is in a failure mode, the grid tie inverters disengage naturally and automatically when the grid goes out of specification, leaving the present invention grid tie charge controller allowing full use of the existing high-voltage photovoltaic array.

Figure 2:
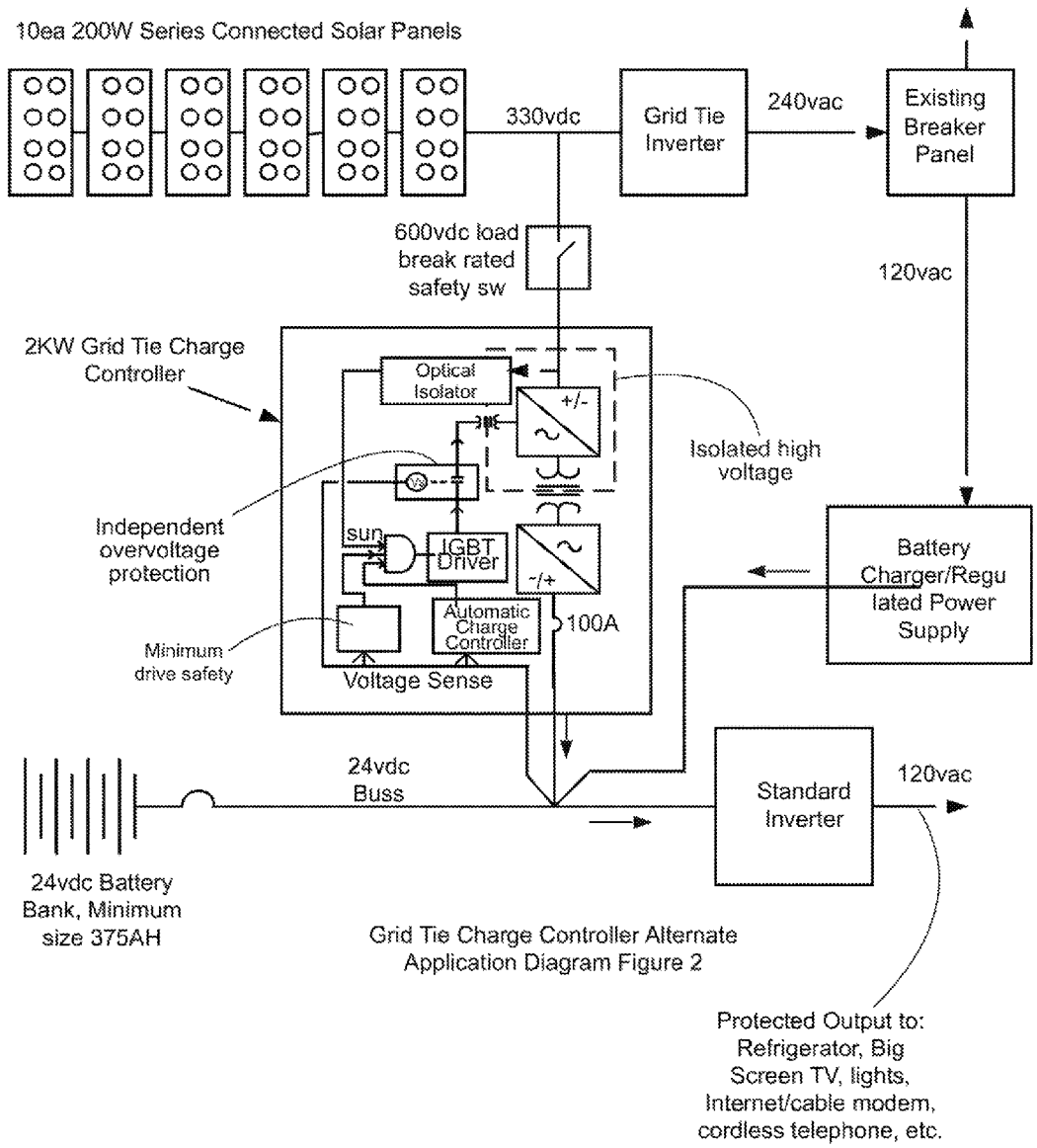
FIG. 2 is grid tie charge controller alternate application diagram.
Figure 3:
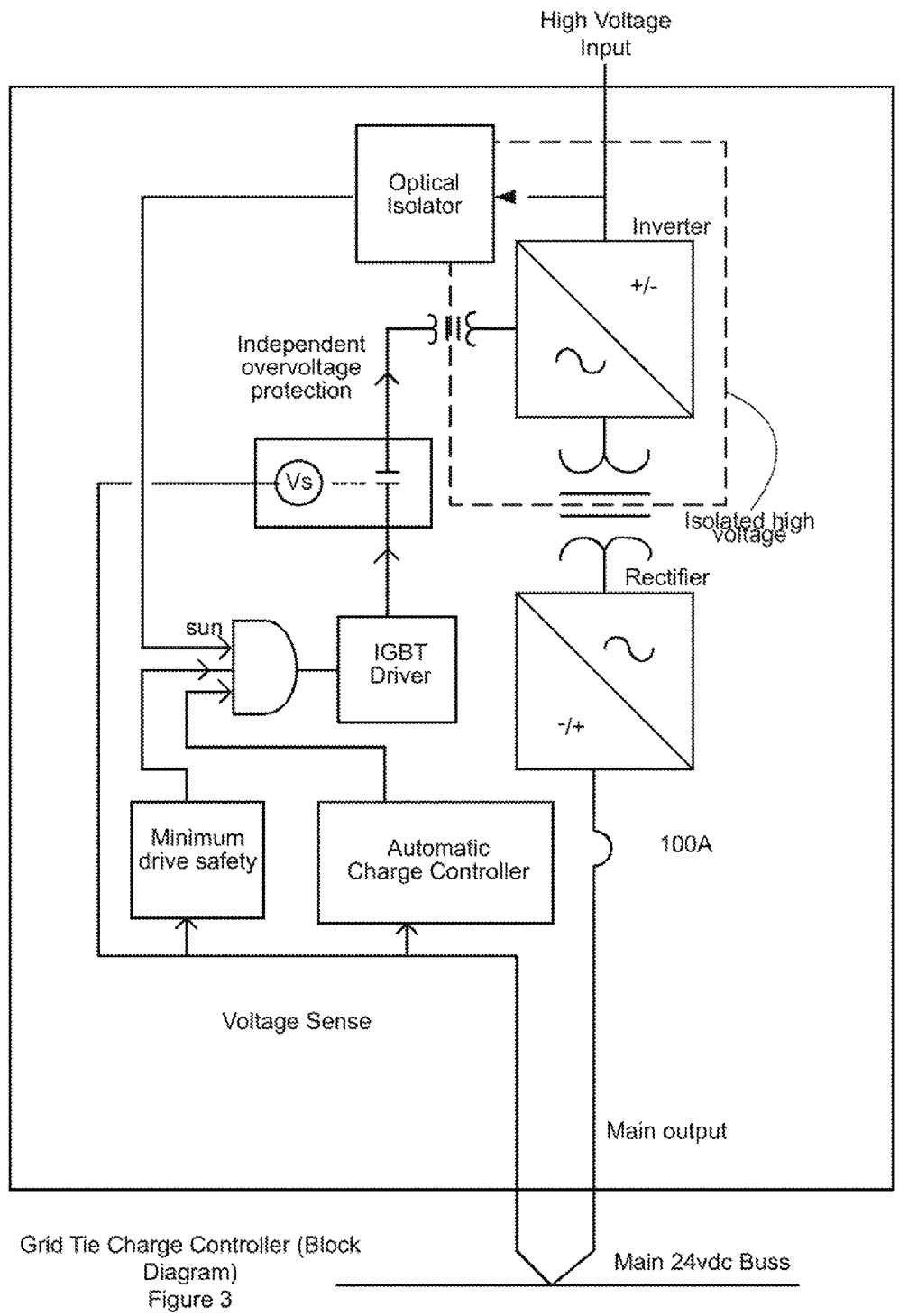
FIG. 3 is a block diagram of the grid tie charge controller.

The automatic charge control coordinates in real time with an existing grid tie system when the grid is normal, in two ways, depending upon two conditions, namely: if the off grid load is within the replenishment capability of either a grid interactive inverter as seen in FIG. 1, or a charging system that runs on the grid as seen in FIG. 2, the automatic charge control stays off because its startup voltage is set lower voltage than the batteries will ever dip to with the grid is on and the batteries being constantly charged by these other means; and if the grid load is over-running the replenishment capability of either a grid interactive inverter, or a charging system, or if a separate grid supplied charging system does not exist, the automatic charge control will start up and assist in supporting the off grid load. The actual split in power from the solar array between the existing grid tie inverter and this invention will be governed by interaction with the grid tie inverter's MPPT (Maximum Power Point Tracking) system. This invention can be coordinated with the grid tie inverter MPPT function in the following way to either direct the bulk of the array power to this invention, or to the grid tie inverter. A low setting of the lower limit of grid tie MPPT voltage will allow the grid tie inverter to starve this invention, conversely a high setting of the lower limit on the grid tie MPPT voltage will cause this invention to receive the bulk of the array power. See FIGS. 1, 2.

Figure 5:
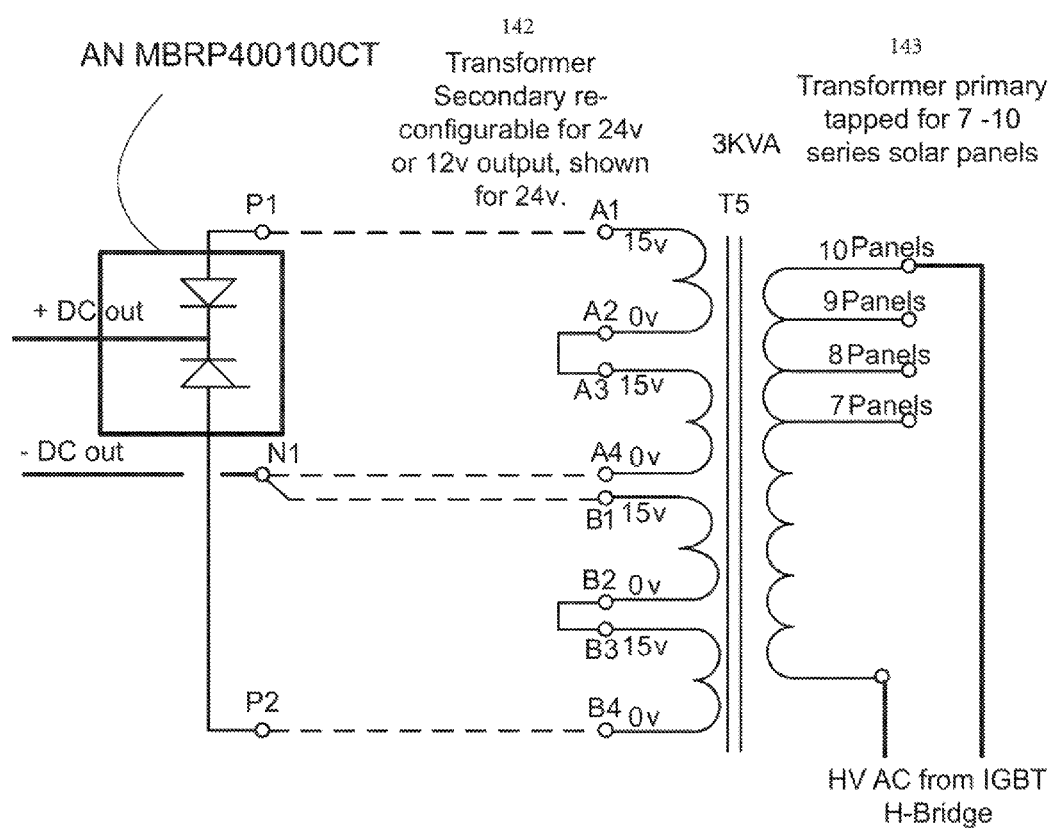
FIG. 5 is a circuit diagram of the transformer power matching circuit of the grid tie charge controller.

The automatic charge control is configured to power match between a grid tie system's solar array and a low voltage set of batteries that are part of an off grid system by pre-selecting the right tap on this invention's step down transformer based on the ratio of the voltage of the grid tie solar array to the normal operating voltage of the off grid battery system. Taps are provided to account for either 7, 8, 9, or 10 ea 24 v nominal solar panels being connected in series as part of the solar array that makes up the host grid time system. See FIG. 5, regarding transformer power matching. A half bridge rectifier 139 such as part number MBRP400 100 CT can be used for providing a DC out positive 140. Also, a DC out negative 141 can be paired with the DC out positive 140.

The automatic charge control is configured to use a simple transformer turns ratio to set the power match with the solar array to avoid a potentially unstable interaction that would likely exist if this device and the existing grid tie inverter were both trying to implement closed loop MPPT functions at the same time. Again, see FIG. 5 Regarding transformer power matching. The transformer primary 143 can be tapped for 7-10 series solar panels. The transformer secondary 142 can be reconfigurable for 24 V or 12 V output. The transformer primary 143 receives power from the high-voltage AC from IGBT H bridge 144.

Figure 6:
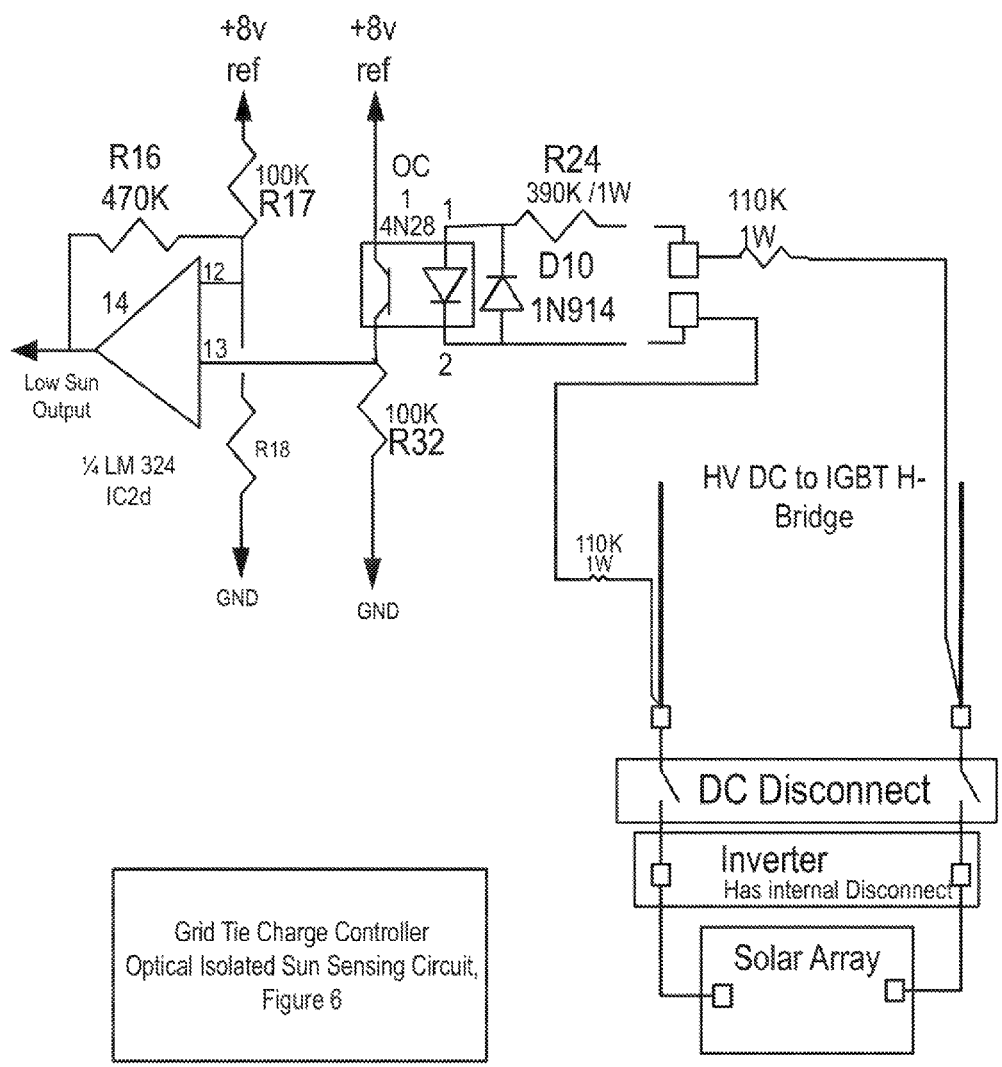
FIG. 6 is a grid tied charge controller optical isolated sun sensing circuit diagram.

The automatic charge control is configured to sample voltage on the high voltage input via an optically isolated circuit to determine whether the solar array is in sunlight or not. If voltage representing sun light is not detected, this invention does not engage. See FIG. 6 describing the optically isolated sun sensing circuit that generates a sun input 124. The low sun output 147 is passed to the sun input 124. An integrated circuit quad operational amplifier 148 such as part number 1/4 LM 324 IC2d can be used for this type of configuration. Preferably, a DC disconnect 146 is also provided. A high-voltage DC to the IGBT H bridge 145 for the sun sensing circuit.

Figure 7:
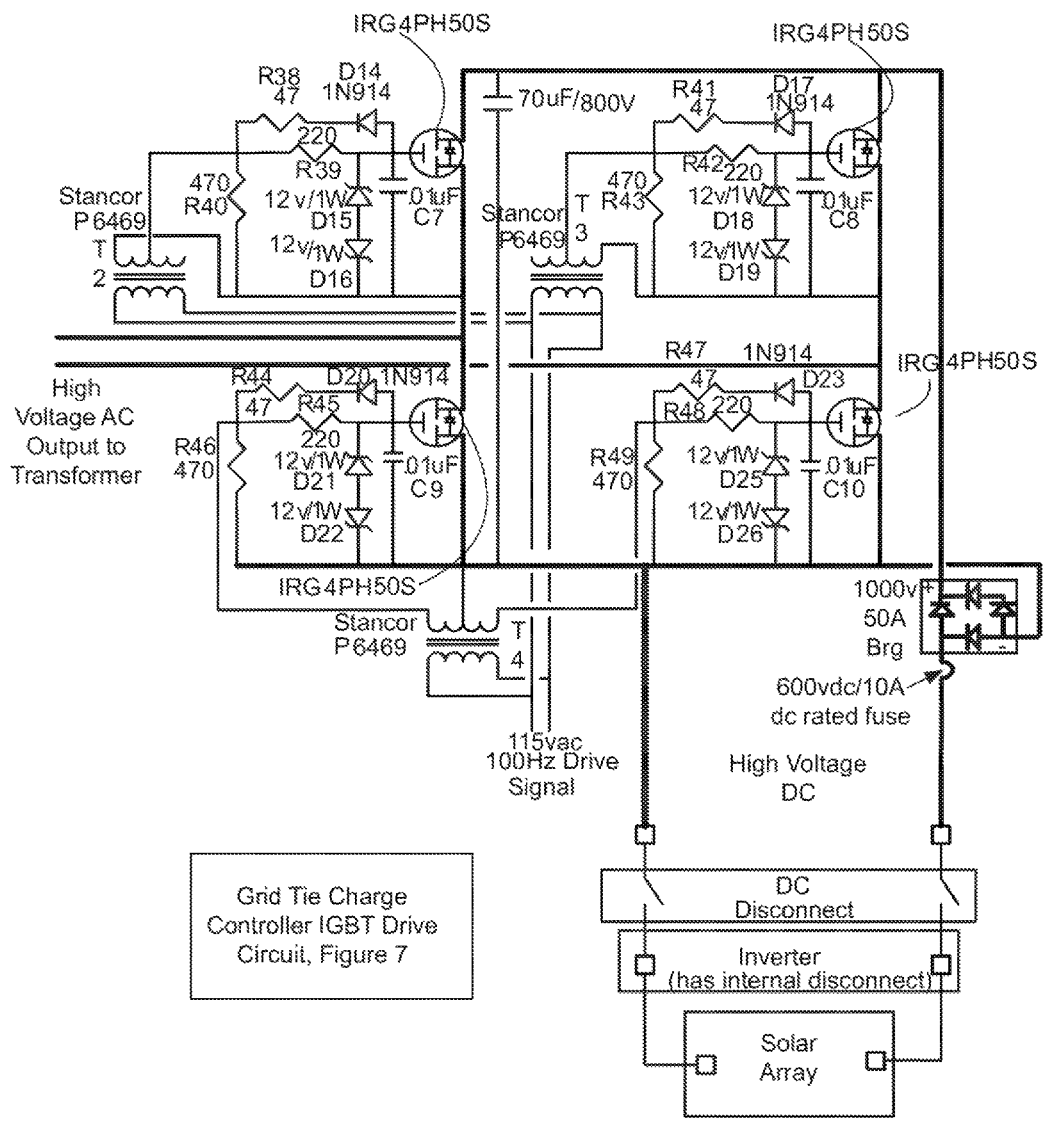
FIG. 7 is a circuit diagram of the IGBT drive circuit.

The automatic charge control is configured with transformer isolation to achieve complete electrical isolation between the high voltage, the low voltage, and the IGBT (Insulated Gate Bi-Polar Transistors) drive circuit sections. See FIG. 5, 7 for a diagram showing how to build the transformer isolated IGBT drive circuit. The grid tie charge controller IGBT drive circuit shown in FIG. 7 includes a first insulated gate bipolar transistor 149 and a second insulated gate bipolar transistor 150 which can both be part number IRG4PH50S.

The automatic charge control ensures that the grid tie charge controller is not conflict with the unknown internal architecture of the grid tie inverter this invention gets paired with, eliminating possible ground fault tripping, or worse yet, a potential short circuit. See FIG. 3. The automatic charge control ensures compatibility with negative or positive ground off grid side equipment; and eliminates the possibility that an IGBT drive circuit failure would result in an IGBT being "stuck on".

Figure 8:
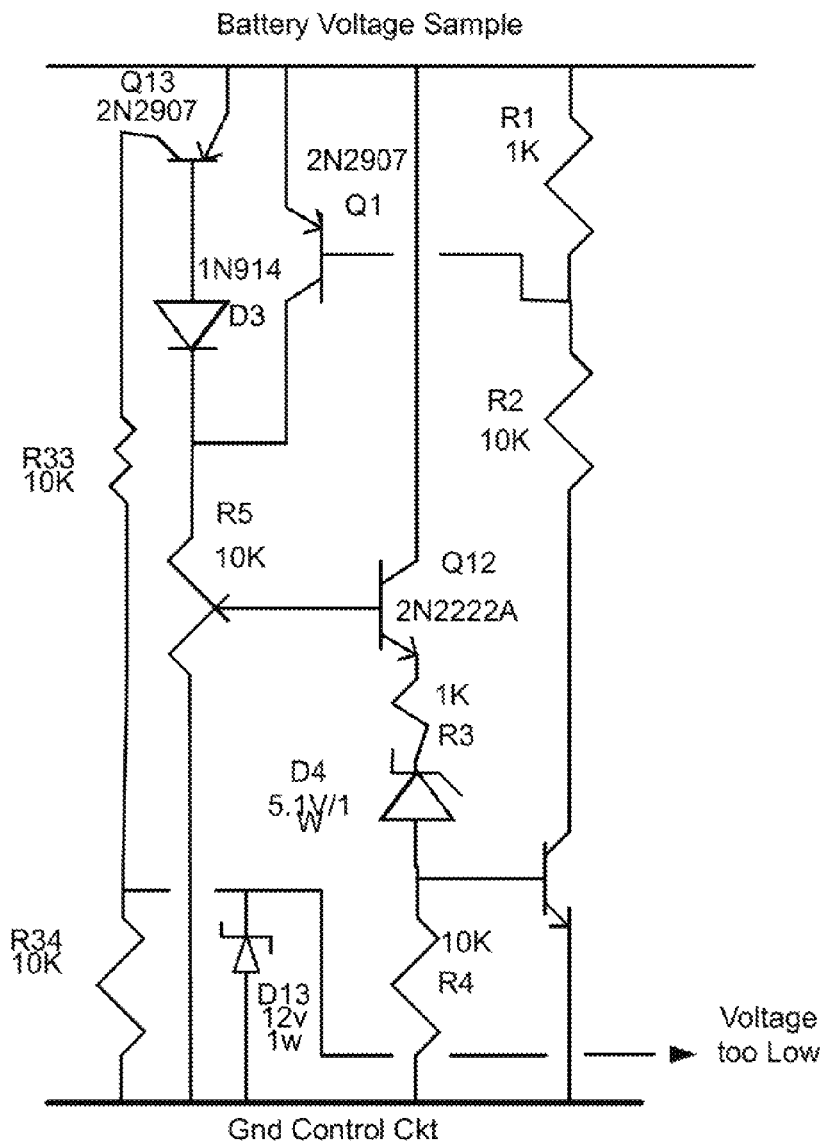
FIG. 8 is a circuit diagram of the low drive protection circuit.

The automatic charge control is configured with engineering controls to insure that SOA (Safe Area of Operation) is maintained for the IGBT devices including: control of the driver circuit supply voltage to ensure that if there isn't enough voltage to make sure the IGBT's are solidly switched on, the driver circuit is shutdown completely immediately, and is not allowed to re-start until there is enough voltage plus a safety margin. See FIG. 8. IGBT's are deliberately oversized to 1200V, 50 A, to insure short term voltage of current overloads can be handled. See FIG. 7. A resistor, capacitor, diode network at the gate circuit of each IGB to deliberately delay start up until the opposing IGBT is turned off. See FIG. 7. Also, a fuse is located at the high voltage DC input just in case a user would accidentally pair this invention with solar array of a higher wattage rating than this invention is rated for. See FIG. 7.

The automatic charge control further includes a diode at the high voltage DC input to prevent any backflow of power to existing solar array or to the existing grid tie inverter. See FIG. 7

The automatic charge control further includes a low voltage output that is both diode and circuit breaker protected to both prevent any back flow of energy, and protected against large battery currents flowing in the event of an internal circuit failure. See FIG. 9.

Figure 9:
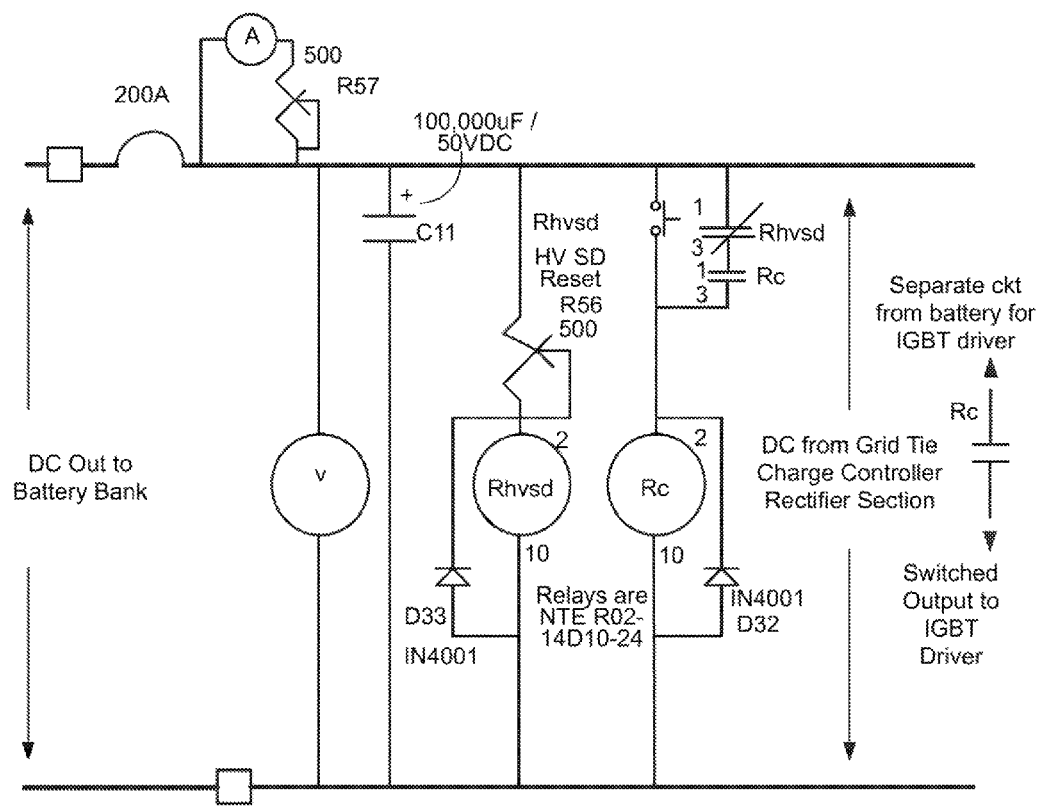
FIG. 9 is a circuit diagram of the grid tie charge controller secondary battery over voltage protection circuit.
Figure 10:
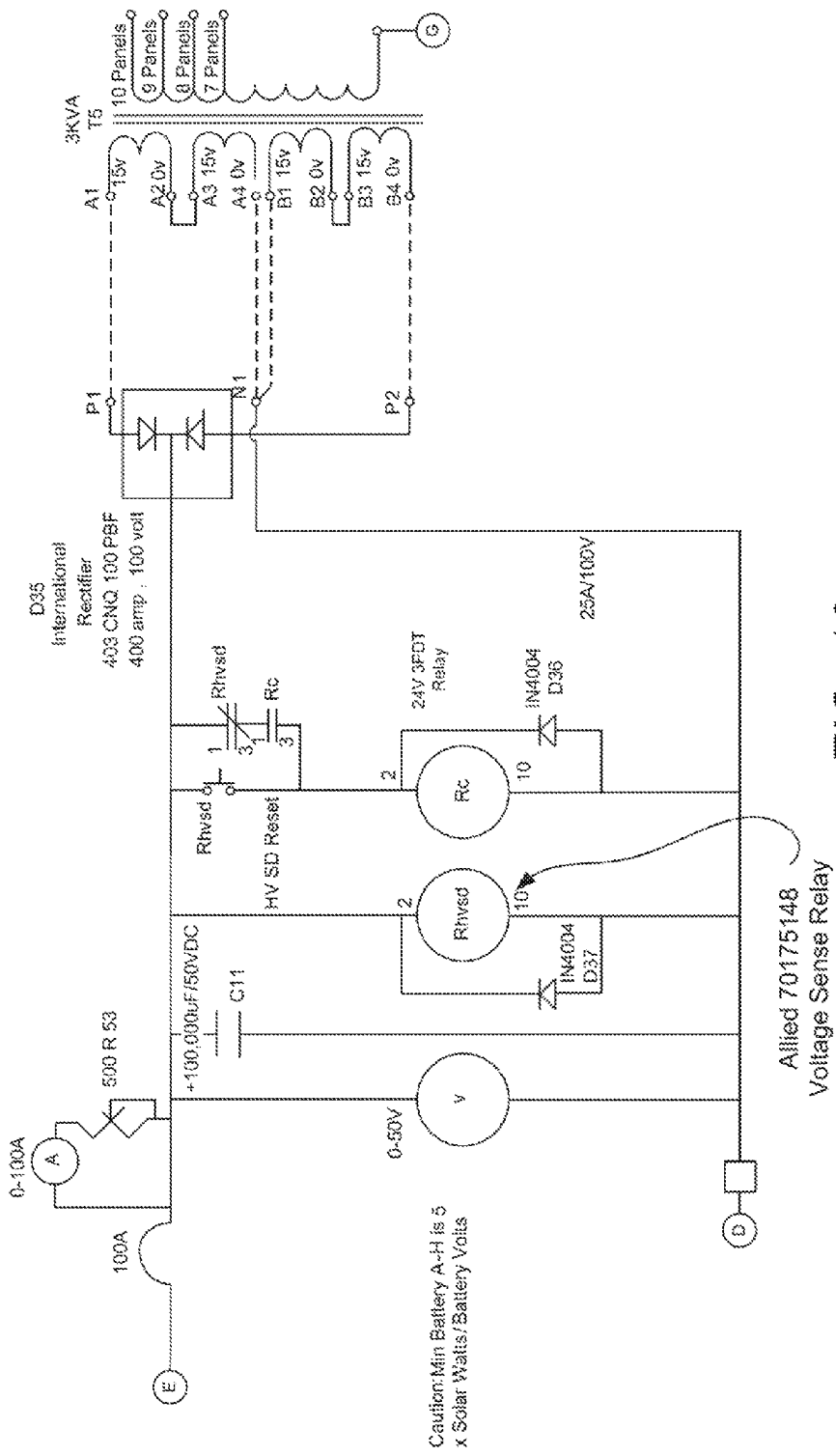
FIG. 10 is a circuit diagram of a portion of the grid tie charge controller, with FIGS. 10-13 being a complete circuit diagram.
Figure 11:
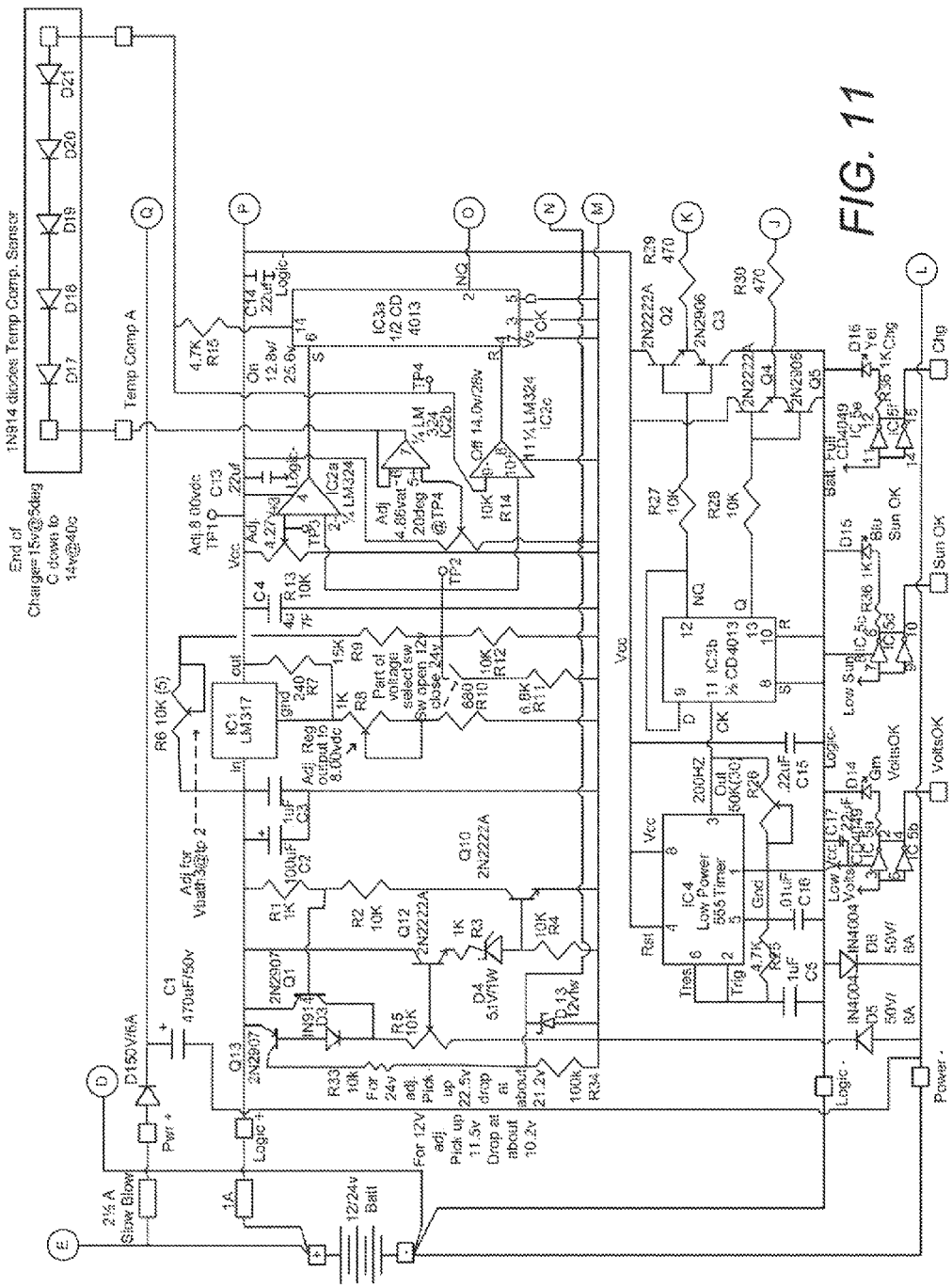
FIG. 11 is a circuit diagram of a portion of the grid tie charge controller, with FIGS. 10-13 being a complete circuit diagram.
Figure 12:
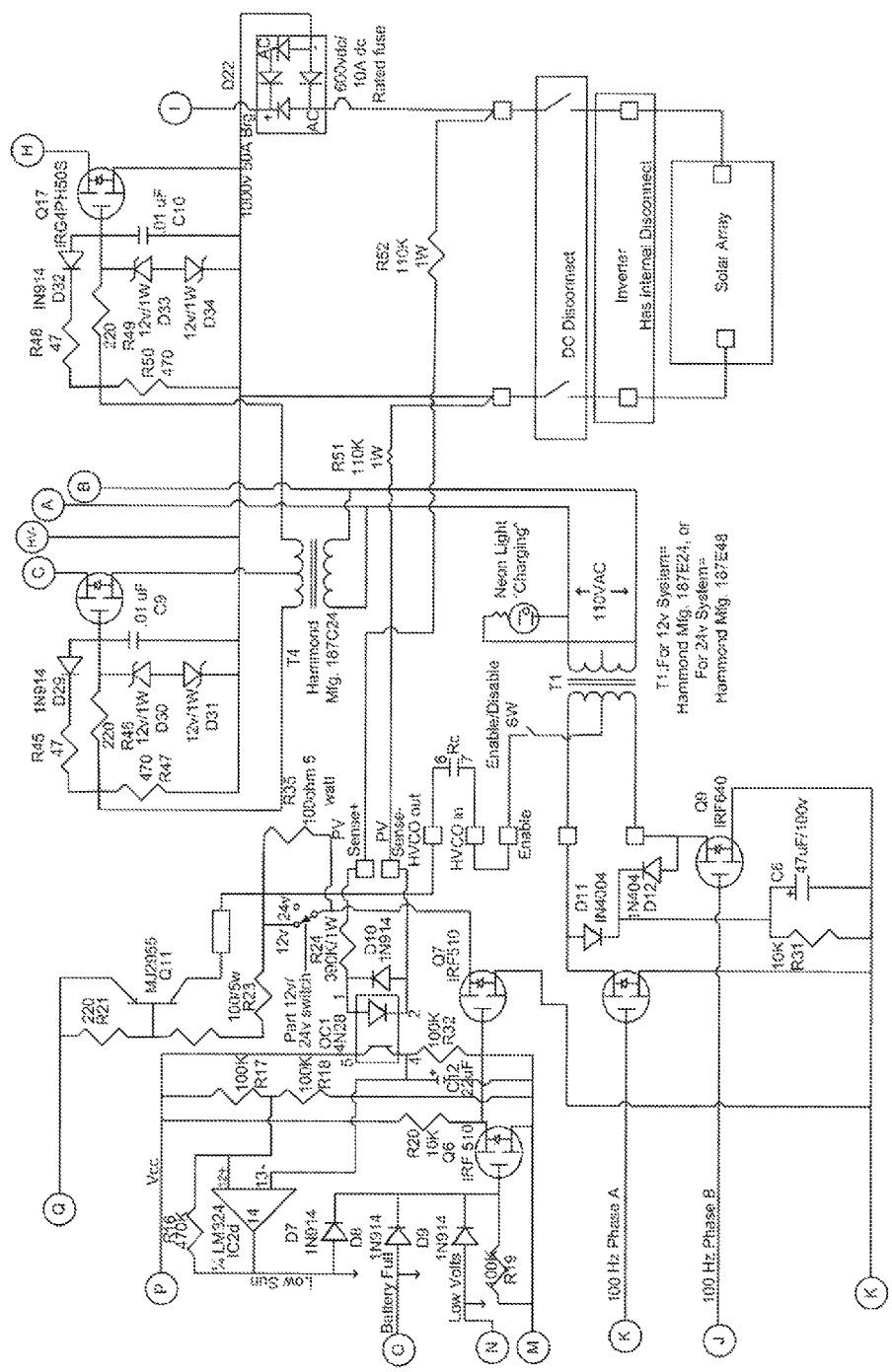
FIG. 12 is a circuit diagram of a portion of the grid tie charge controller, with FIGS. 10-13 being a complete circuit diagram.
Figure 13:
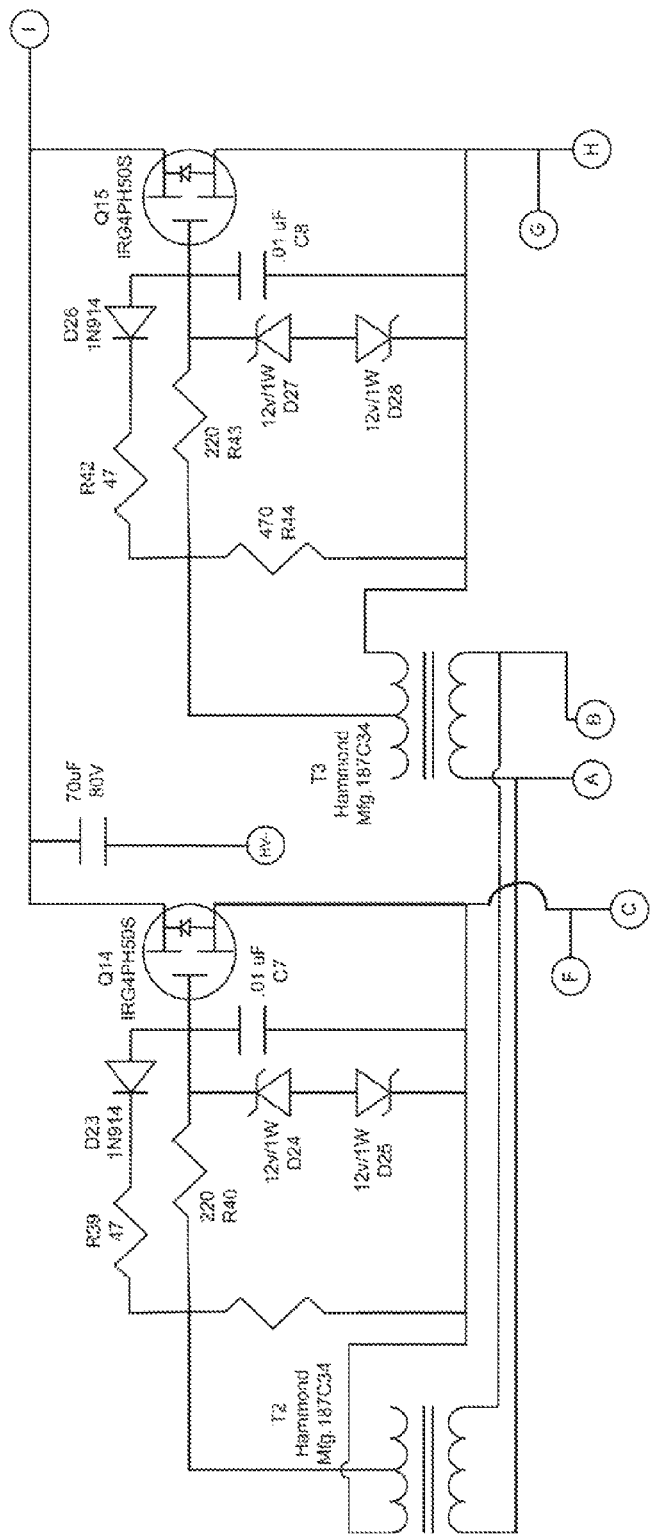
FIG. 13 is a circuit diagram of a portion of the grid tie charge controller, with FIGS. 10-13 being a complete circuit diagram.

The automatic charge control further includes a separate secondary layer of protection against overcharging the battery bank that this invention is designed to connect to. While it is the primary function of this invention to engage and disengage as necessary to keep a battery bank charged, but not over-charged, a secondary voltage sensing relay is allowed to unlatch a control relay that has been latched up on its own contacts, permanently dropping the IGBT drive signal until a human can investigate the reason for the "control failure" that allowed the high-high battery voltage condition. The process is restarted by a human pushing a start button or some other control once the battery voltage is down into the acceptable range. The independent overvoltage protection 114 circuit provides a yet another layer of safety. For an example of an independent overvoltage protection 114 circuit, see FIG. 9, showing the secondary voltage protection circuit. The automatic charge control further includes a separate circuit for sensing battery voltage right at the battery terminals so that decision point voltages are not distorted voltage drop in the main power leads that carry large amounts of current on the low voltage off grid side. See FIG. 10 for the disclosure of the control circuit card and voltage sensing.

To make it easy to build this device, from time to time, the values of components, and even the part numbers are provided. Disclosure of the component values and the part numbers is not intended to limit the scope of the claims in any way. FIGS. 10-13 are a complete circuit diagram with all of the part numbers and component values which can be used for manufacturing the device. Equivalent components may have similar function.

The invention claimed is:

1. A grid tie charge controller system for an existing high-voltage photovoltaic array comprising:
   a. a grid tied charge controller connecting in parallel between the existing high voltage photovoltaic array and an existing high voltage gird tie inverter, wherein the grid tie charge controller is configured to retrofit "tap in" to an existing grid tie photovoltaic system to draw off power to charge storage batteries, wherein the grid tie charge controller is diode isolated on the input and output;
   b. a transformer transforming a high voltage of between 200-500 vdc of the photovoltaic array down to a battery bank, wherein the battery bank is a low voltage high current 12/24 v battery bank, wherein the battery bank powers a low voltage off grid system;
   c. an automatic charge control circuit governing the battery bank that engages and disengages as necessary to maintain the battery at a preset charge state, wherein the automatic charge control includes a temperature compensator of a disengagement point; wherein the grid tie charge controller system enables an existing high voltage solar array that is part of an existing grid tie system to support an auxiliary functionality of powering a low voltage off grid system, when power is interrupted.

2. The grid tie charge controller system of claim 1, wherein the automatic charge control is configured to coordinate in real time with an existing grid tie system such that when the grid is in a failure mode, the grid tie inverter disengages automatically when the grid goes out of specification, isolating the present invention grid tie charge controller while allowing full use of the existing high-voltage photovoltaic array, for the low voltage off grid system.

3. The grid tie charge controller system of claim 1, wherein the automatic charge control coordinates in real time with an existing grid tie system when the grid is normal, in two modes depending upon two conditions, namely:
   a. if the off grid load is within a replenishment capability of either a grid interactive inverter, or a charging system that runs on the grid, the automatic charge control stays off because its startup voltage is set to a lower voltage than the storage batteries will dip to when the grid is on and the storage batteries are being constantly; and
   b. if the grid load is over-running the replenishment capability of either a grid interactive inverter, or a charging system, or if a separate grid supplied charging system does not exist, the automatic charge control will start up and assist in supporting the off grid load, while maintaining electrical isolation.

4. The grid tie charge controller system of claim 1, wherein the actual split in power from the solar array between the existing grid tie inverter and the grid tie charge controller system is be governed by interaction with the grid tie inverter's MPPT (Maximum Power Point Tracking) system, wherein the grid tie charge controller system coordinates with the grid tie inverter MPPT function to either direct the bulk of the array power to this invention, or to the grid tie inverter, wherein a low setting of the lower limit of grid tie MPPT voltage will allow the grid tie inverter to starve this invention, and conversely a high setting of the lower limit on the grid tie MPPT voltage will cause this invention to receive the bulk of the array power.

5. The grid tie charge controller system of claim 4, wherein the automatic charge control is configured to power match between a grid tie system's solar array and a low voltage set of batteries that are part of an off grid system by pre-selecting the right tap on a step down transformer based on the ratio of the voltage of the grid tie solar array to a normal operating voltage of the off grid battery system, wherein taps are provided to account for either seven, eight, nine, or ten 24 v nominal solar panels being connected in series as part of the solar array that makes up the host grid tie system.

6. The grid tie charge controller system of claim 4, wherein the automatic charge control is configured to use a simple transformer turns ratio to set the power match with the solar array to avoid a potentially unstable interaction that would likely exist if this device and the existing grid tie inverter were both trying to implement closed loop MPPT functions at the same time, controlling unwanted interaction between MPPT algorithms.

7. The grid tie charge controller system of claim 4, wherein the automatic charge control is configured to sample voltage on the high voltage input via an optically isolated circuit to determine whether the solar array is in sunlight or not, wherein if the solar array is not in sunlight, the grid tied charge controller system does not engage.

8. The grid tie charge controller system of claim 4, wherein the automatic charge control is configured with transformer isolation to achieve complete electrical isolation between the high voltage, the low voltage, and the IGBT (Insulated Gate Bi-Polar Transistors) drive circuit sections in order to:
   a. not conflict with the unknown internal architecture of the grid tie inverter this invention gets paired with, eliminating possible ground fault tripping, or worse yet, a potential short circuit;
   b. insure compatibility with negative or positive ground off grid side equipment;
   c. eliminate the possibility that an IGBT drive circuit failure would result in an IGBT being "stuck on".

9. The grid tie charge controller system of claim 4, wherein the automatic charge control is configured with engineering controls to insure that SOA (Safe Area of Operation) is maintained for the IGBT devices including:
   a. control of the driver circuit supply voltage to ensure that if there isn't enough voltage to make sure the IGBT's are solidly switched on, the driver circuit is shutdown completely immediately, and is not allowed to re-start until there is enough voltage plus a safety margin;

b. IGBT's are deliberately oversized to 1200V, 50 A, to insure short term voltage of current overloads can be handled;

c. a resistor, capacitor, diode network is provided at the gate circuit of each IGB to deliberately delay start up until the opposing IGBT is turned off; and d. a fuse at the high voltage DC input just in case a user would accidentally pair this invention with solar array of a higher wattage rating than this invention is rated for.

10. The grid tie charge controller system of claim 4, wherein the automatic charge control further includes a diode at the high voltage DC input to prevent any backflow of power to existing solar array or to the existing grid tie inverter, wherein power flows only to the batteries from the automatic charge control.

11. The grid tie charge controller system of claim 4, wherein the automatic charge control further includes a low voltage output that is both diode and circuit breaker protected to both prevent any back flow of energy, and protected against large battery currents flowing in the event of an internal circuit failure.

12. The grid tie charge controller system of claim 4, wherein the automatic charge control further includes a secondary voltage sensing relay that unlatches a control relay that has been latched up on its own contacts, permanently dropping the IGBT drive signal until a human can investigate the reason for the "control failure" that allowed the high-high battery voltage condition, wherein the grid tied charge controller system is restarted when a user pushes the start button after the battery voltage is down into an acceptable range.

13. The grid tie charge controller system of claim 4, wherein the automatic charge control further includes a separate circuit for sensing battery voltage right at the battery terminals so that decision point voltages are not distorted voltage drop in the main power leads that carry large amounts of current on the low voltage off grid side.

\* \* \* \* \*